July 20, 1948.  T. J. VAUGHN ET AL  2,445,502
APPARATUS FOR CONVERTING FUELS
FROM LIQUID TO GASEOUS STATE Filed May 4, 1944  3 Sheets-Sheet 1

Inventors
Thomas J. Vaughn
Ben O. Morgan

By Clarence A. O'Brien
and Harvey B. Jacobson
Attorneys

July 20, 1948.  T. J. VAUGHN ET AL  2,445,502
APPARATUS FOR CONVERTING FUELS
FROM LIQUID TO GASEOUS STATE Filed May 4, 1944  3 Sheets-Sheet 2

July 20, 1948.    T. J. VAUGHN ET AL    2,445,502
APPARATUS FOR CONVERTING FUELS
FROM LIQUID TO GASEOUS STATE Filed May 4, 1944    3 Sheets-Sheet 3

Inventors
Thomas J. Vaughn
Ben O. Morgan

By Clarence A. O'Brien
and Harvey B. Jacobson
Attorneys

Patented July 20, 1948

2,445,502

UNITED STATES PATENT OFFICE 2,445,502

APPARATUS FOR CONVERTING FUELS FROM LIQUID TO GASEOUS STATE

Thomas J. Vaughn and Ben O. Morgan, Odessa, Tex.; said Morgan assignor to said Vaughn Application May 4, 1944, Serial No. 534,136

5 Claims. (Cl. 62—1)

Our invention relates to a method and apparatus devised and constructed for the purpose of producing a very efficient motor fuel by converting liquid butane to gaseous state by the use of a novel and improved vaporizer.

Due to the unique construction of this unit, which incorporates an atomizing jet, a fuel distributing screen, upper and lower expansion chambers, and baffle plates in the inner expansion chamber, we have perfected a vaporizer which will vaporize more gallons of butane per square inch of exposed heated surface than any other unit which is now on the market and which is quite simple in construction and operation.

The purpose of this vaporizing unit is to change liquid fuel, such as butane to a gaseous form so that it can be used as a motor fuel. The heating element is hot water circulated through the vaporizer from the cooling water of the engine. The butane enters the liquid pressure regulator and is reduced to 15 pounds' pressure before the liquid enters the vaporizer. The liquid then passes through the atomizing jet into the upper expansion chamber. This is the first stage of expansion. The butane then falls down on the fuel distributing screen which lies over the tubes, in a partial liquid and partial gas form. The butane then passes downward through the tubes and further expands and changes to a more gaseous form as it passes downward. This is the second stage of expansion. The butane then enters the lower expansion chamber at the bottom and further expands to a more gaseous form. It then passes through the four ¾ inch holes from the lower expansion chamber to the inner expansion chamber which is the final stage of expansion and vaporization. The purpose of the baffle plates is to deflect any liquid back into the inner expansion chamber and completes its vaporization which liquid might otherwise try to overflow, due to sudden acceleration of the engine.

A detailed description of the apparatus and method of operation is here given with the description of the attached drawings illustrating one embodiment of the invention and wherein like reference numerals refer to the same parts.

In the drawings:

Figure 5 is a fragmentary axial section of a tube of the inner or middle expansion chamber in perspective and enlarged scale.

Figure 1:
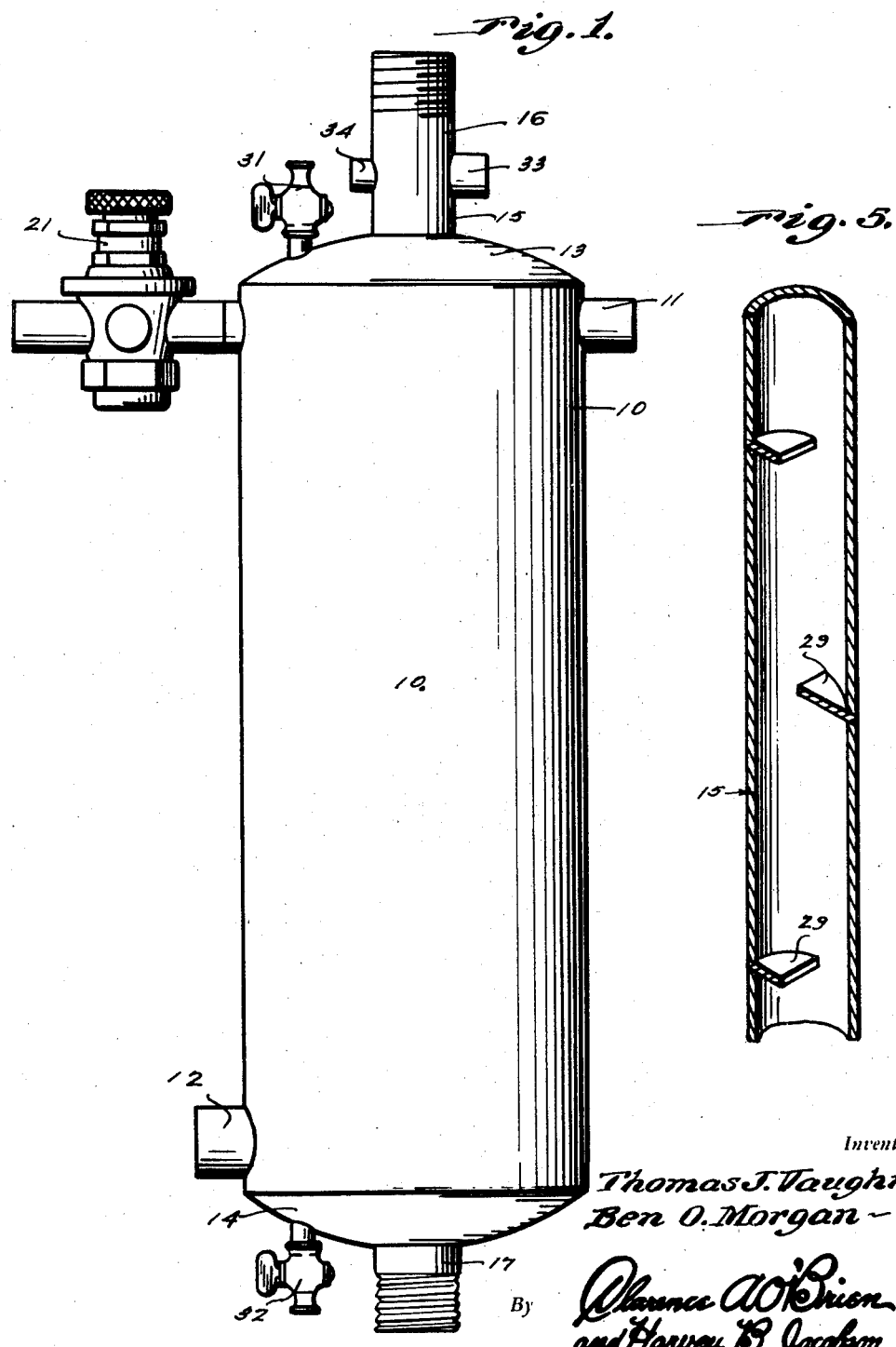
Figure 1 represents in elevation the exterior aspect of the vaporizer.
Figure 2:
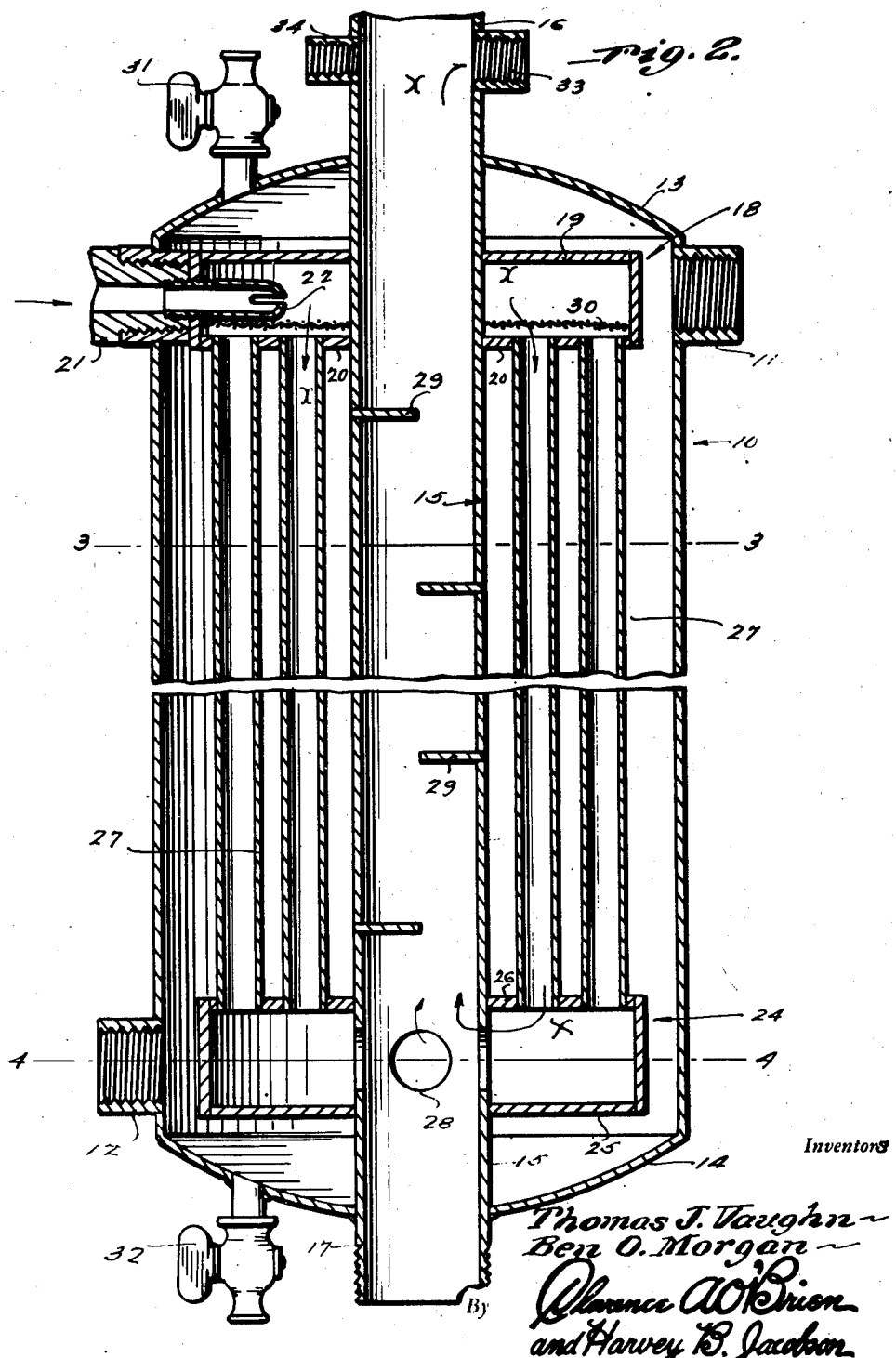
Figure 2 is an axial vertical section of the same.
Figure 3:
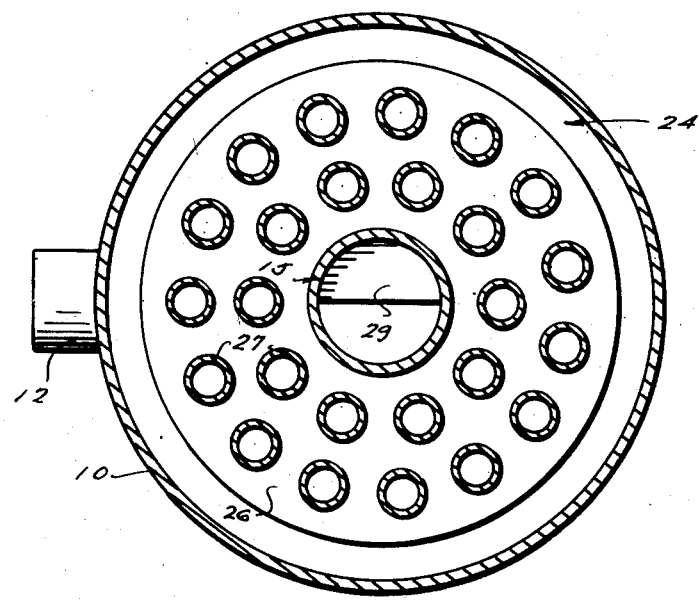
Figure 3 is a horizontal section taken along line 3—3 of Figure 2.
Figure 4:
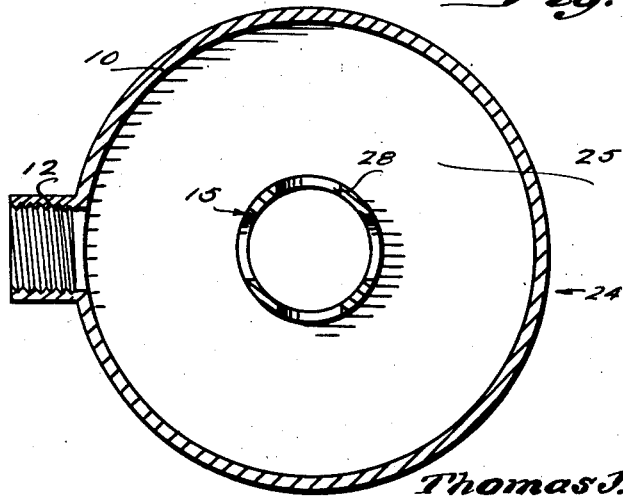
Figure 4 is a similar section along the line 4—4 of Figure 2.

The vaporizer consists of a cylinder 10 in which the heating element used is hot water preferably such as the cooling water from an internal combustion engine. The water enters through the pipe connection at 11 into the top of the cylinder 10 to circulate therethrough at regulated speed, and near the bottom of the upright cylinder 10, the water may be drawn off through another pipe connection 12 after having heated the entire vaporizer.

The principal elements of the vaporizer are the upper, middle and lower expansion chambers, a fuel atomizing jet and a fuel distributing screen.

Axially located in the cylinder 10, which is closed at the top by a dome-shaped cover plate 13 and at the bottom by another dome-shaped plate 14, runs a tube 15, which extends with its open ends 16 and 17, at both ends beyond said dome plates. In this manner a closed chamber is formed within the vessel 10 through which the heating water circulates to heat all three expansion chambers and other parts of the vaporizer contained within the cylindrical vessel 10.

Just under the dome plate 13 at the top of the vessel 10 is located the first or upper expansion chamber 18 which is built as a flat cylinder somewhat smaller in diameter than the vessel 10 and closed by the top plate 19 and the bottom plate 20 having a series of openings shown arranged in concentric circular rows. On one side of the upper expansion chamber 18 is shown a pressure regulator 21 of any suitable construction provided with a vaporizing nozzle 22 for admitting a jet of fuel directed radially into the upper expansion chamber 18.

The second or lower expansion chamber 24 is of similar construction and size as the upper chamber 18 in reverse position and has a solid bottom plate 25, while its top plate 26 is perforated having a series of openings also shown arranged in concentric circular rows like the opposing top plate 20 of the upper expansion chamber 18. In these openings are fitted the same number of vertical nest of pipes 27 to provide outwardly closed connections between the two chambers 18 and 24.

The central vertical tube 15, which constitutes the third, inner or middle expansion chamber has four or more radial apertures 28 communicating with the interior of the lower expansion chamber 24. During operating the bottom end 17 of the tube 15 is capped and since the top end 16 of tube 15 leads to the fuel distribution system this produces a closed vaporizer system of the three chambers, namely: the upper, lower and middle expansion chambers 18, 24 and 15. The tube 15 of the middle expansion chamber is provided with a number of horizontally positioned baffles 29. These consist of semi-circular plates which are spaced apart in the interior of the tube 15 and secured thereto in staggered position reaching inwards to the diametrical line from the interior surface of the tube 15 thereby providing a zig-zag path for the butane or other fuel being treated. This will cause separation from the rising fuel of any moisture that may adhere thereto. When such moisture strikes the baffles it will be separated and collected for further treatment. Also, these baffles or baffle plates 29 serve to deflect any liquid back into the inner tube or tubular expansion chamber 15 which might tend to overflow the top of the tube due to sudden acceleration of the engine, so that the vaporization thereof may be completed.

In the upper expansion chamber 18 is also furnished a distributing screen 30, which preferably consists of a $\frac{1}{32}$ inch mesh of stainless steel screen, and is placed close to the bottom plate 20 in order for the liquid fuel to be treated to pass through screen 30 before entering the nest of pipes 27 on the way to the lower expansion chamber 24.

At the upper, outer end of the tube 15 are shown a pair of radially directed, threaded pipe sockets to the smaller of which 34 is attached a pressure gage, and the larger of which 33 is a relief valve; also the gaseous fluid may be drawn off from 33 through conduits to the engines wherein it is to be used, or for other purposes.

In order to prevent leakage at the joints between plates, tubes and pipes all such connections are brazed or welded. At 31 is shown an air vent to prevent air locking in the vaporizer system; at 32 is shown a water drain and at 17 is shown a blow-out or sediment trap.

The operating principle of the vaporizer is that the liquid butane enters the pressure regulator 21 and is therein reduced to 15 pounds; the liquid then passes through the atomizing jet 22 and falls on the fuel distributing screen 30 which lies on top of the tubes 27. The vaporizing begins as the liquid enters the upper expansion chamber 18. It passes through the tubes 27 to the lower expansion chamber 24, and from there to the inner expansion chamber 15. This unit has, accordingly, a four-point stage of expansion before complete vaporization of the butane or other liquid fuel is obtained.

In short, the vaporizer unit is heated on all sides by hot water admitted at 11 into the heating chamber of the housing 10 in which the vaporizer unit is enclosed. Liquid fuel is thereupon admitted, at 15 pounds pressure, through the nozzle 22 from the pressure regulator 21 to fill the preliminary or upper expansion chamber 18, there to be evenly distributed by the screen 30. The fuel now becomes partially evaporized and then passes down through the screen and the nest of vertical pipes 27 into the second or lower expansion chamber 24, wherein the fuel becomes further evaporized. From there the fuel proceeds through the apertures 28 into the final expansion chamber 15 in a zig-zag upward direction caused by the interfering baffles 29. These baffles prevent any liquid fuel still remaining to proceed from further progress in order to be dropped down for final evaporation, while the gaseous fuel continues in upward direction to be drawn off through conduits attached in the threaded pipe nipple 16.

It is to be understood that the invention as here disclosed is not limited to the details here described and shown but that the same may be varied widely without departing from the spirit of the invention as defined by the subjoined claims.

Having described the invention, what is claimed as new is:

1. A vaporizer unit for converting fuel from liquid into gaseous state, comprising a common, closed cylindrical housing, means for heating said housing, a plurality of interconnected coaxial expansion chambers consisting of one central and two end chambers, spaced within the housing around the central chamber; liquid fuel admitting means extending through one side of the housing into the first of said end chambers for admitting liquid fuel under pressure and in which regulation takes place to initially reduce the pressure, and having an atomizer nozzle opening into said first end chamber, a distributing screen therein, tubular connections between the end chambers within the common housing, whereby the liquid fuel becomes gradually increasingly vaporized in each subsequent expansion chamber.

2. A vaporizer unit for converting fuel from liquid into gaseous state, comprising a common, closed cylindrical housing, means for heating said housing, a plurality of coaxial expansion chambers consisting of one central and two end chambers spaced within the housing around the central chamber; liquid fuel admitting means extending through one side of the housing into the first of said end chambers, and having an atomizer nozzle for admitting liquid fuel under pressure and in which regulation takes place to initially reduce the pressure, said atomizer nozzle opening into said first end chamber, a distributing screen therein, tubular connections between the end chambers within the common housing, whereby the liquid fuel becomes gradually increasingly vaporized in each subsequent expansion chamber, said central expansion chamber extending through the ends of the housing and having radial communication with the second of the end chambers and being provided with baffle plates arranged to partly obstruct the progress of the fuel therethrough, thereby providing a zigzag path for the fuel in order to separate liquid from gaseous constituents and return them for additional evaporation.

3. A vaporizer unit for converting fuel from liquid into gaseous state, comprising a common, closed cylindrical housing, means for heating said housing, a plurality of interconnected coaxial expansion chambers consisting of one central and two end chambers spaced within the housing around the central chamber; liquid fuel admitting means extending through one side of the housing into the first of said end chambers for admitting liquid fuel under pressure and in which regulation takes place to initially reduce the pressure, and having an atomizer nozzle opening into said first end chamber, a distributing screen therein, tubular connections between the end chambers within the common housing whereby the liquid fuel becomes gradually increasingly vaporized in each subsequent expansion chamber, said central expansion chamber having the form of a tube extending axially through the ends of said housing and means for delivering the resultant gaseous fuel therefrom.

4. A vaporizer unit comprising a common, closed housing, means for heating the same, and a vaporizer unit enclosed in said housing consisting of a series of coaxial, interconnected expansion chambers, the first of said expansion chambers positioned near the top of the housing having a closed top and a perforated bottom, the second of the expansion chambers having a closed bottom and a perforated top, tubular connections between the perforations in said bottom and top of said first and second expansion chambers, a distributing screen over said perforations in the first expansion chamber, liquid fuel admitting means extending through the housing and provided with an atomizer nozzle adapted for delivering liquid fuel into said first expansion chamber and in which the pressure has been initially reduced by a regulator, the third of said series of chambers being a central expansion chamber in the form of a closed tube extending axially through the ends of said housing and means for delivering the resultant gaseous fuel therefrom, and baffles in said tube spaced apart to provide a zig-zag path for the fuel in order to partially slow up the progress of the fuel therethrough and thereby to separate the liquid from the gaseous constituent of the fuel for retreatment.

5. A vaporizer unit comprising a closed housing forming a heating chamber, means for heating the same, and a vaporizer unit enclosed in said heating chamber, said unit consisting of a series of interconnected expansion chambers, the first of said expansion chambers positioned near the top of the housing having a closed top and a perforated bottom, the second of the expansion chambers having a closed bottom and a perforated top with tubular connections between the perforations in both of said two expansion chambers, a central tubular expansion chamber extending through the housing and chambers, a distributing screen in the first expansion chamber at the bottom around the central tubular expansion chamber over said perforations and upper ends of the tubular connections in and at the bottom of the first expansion chamber, a pressure regulator with an atomizer nozzle adapted for delivering liquid fuel under pressure, into said first expansion chamber, said central expansion chamber being provided with means for delivering the resultant gaseous fuel therefrom.

THOMAS J. VAUGHN.
BEN O. MORGAN.

REFERENCES CITED

The following references are of record in the file of this patent:

UNITED STATES PATENTS

| Number | Name | Date |
|---|---|---|
| 1,215,555 | Langevin | Feb. 13, 1917 |
| 1,531,777 | Frost | Mar. 31, 1925 |
| 1,609,756 | MacMahon | Dec. 7, 1926 |
| 1,835,887 | Mackey | Dec. 8, 1931 |
| 1,963,857 | Lucas et al. | June 19, 1934 |